(12) United States Patent
Kameda

(10) Patent No.: US 6,273,668 B1
(45) Date of Patent: Aug. 14, 2001

(54) WHEEL CHAIR STORAGE APPARATUS OF CAR

(75) Inventor: Fujio Kameda, Ohtone-machi (JP)

(73) Assignee: Nissin Jidosha Kogyo Co., Ltd., Saitama-ken (JP)

(*) Notice: Subject to any disclaimer, the term of this patent is extended or adjusted under 35 U.S.C. 154(b) by 0 days.

(21) Appl. No.: 09/513,173

(22) Filed: Feb. 25, 2000

(30) Foreign Application Priority Data

Feb. 25, 1999 (JP) ................................................. 11-048354

(51) Int. Cl.[7] ....................................................... B60R 9/04
(52) U.S. Cl. ........................ 414/462; 224/321; 224/328; 414/542; 414/921
(58) Field of Search .................................. 224/319, 321, 224/328; 414/462, 921, 542

(56) References Cited

U.S. PATENT DOCUMENTS

| 2,600,082 | * | 6/1952 | Sumner | 414/462 |
| 3,608,759 | | 9/1971 | Spurgeon . | |
| 3,878,955 | * | 4/1975 | Udden | 414/462 |
| 4,242,030 | | 12/1980 | Clement | 414/462 |
| 4,376,611 | * | 3/1983 | Koop | 414/462 |
| 4,440,540 | | 4/1984 | Gottlieb et al. | 414/462 |
| 4,484,851 | * | 11/1984 | Gottlieb et al. | 414/921 X |
| 4,544,321 | * | 10/1985 | Lanier | 414/921 X |
| 4,682,719 | * | 7/1987 | Ernst et al. | 224/321 X |
| 5,535,929 | * | 7/1996 | Neill | 224/328 X |

FOREIGN PATENT DOCUMENTS

| 44 12 689 | 10/1995 | (DE) . |
| 2 139 178 | 11/1984 | (GB) . |
| 3-12598 | 3/1991 | (JP) . |

* cited by examiner

*Primary Examiner*—Janice L. Krizek
(74) *Attorney, Agent, or Firm*—Jacobson Holman, PLLC

(57) ABSTRACT

A wheel chair storage apparatus stores a wheel chair of a physically handicapped person in a folded state in a storage space arranged on the roof of a car. The apparatus comprises a main body including a storage section for storing the folded wheel chair; a fitting device for fitting the main body to the roof of the car; slider movable back and forth between the main body and a position located above a doorway of the car; a lift device arranged on the lift for lifting the wheel chair from said doorway; a wheel chair folding device interlocked with said lift device for folding the wheel chair being lifted by said lift device; a wheel chair holder for folding said folded wheel chair; and an attitude modifying device for modifying the attitude of the wheel chair so as to make it adapted to storage by rotating the wheel chair holder with said wheel chair.

8 Claims, 7 Drawing Sheets

WHEEL CHAIR STORAGE APPARATUS OF CAR

BACKGROUND OF THE INVENTION

1. Field of the Invention

This invention relates to a wheel chair storage apparatus for storing a wheel chair to be used by a physically handicapped on the roof of a car such as an automobile.

2. Related Background Art

Conventionally, when the user of a wheel chair drives a car such as automobile, he or she has to fold the wheel chair and put it on the rear seats, the loading platform or the passenger seat of the car. A wheel chair is significantly heavy and bulky and hence such an operation of folding and loading the wheel chair is a heavy work to be done. To avoid this problem, various apparatus for storing a folded wheel chair in a storage space provided on the roof of a car such as automobile have been proposed to date. Japanese Utility Model Application Laid-Open No. 3-12598 is one of such proposals.

Japanese Utility Model Application Laid-Open No. 3-12598 describes a wheel chair storage apparatus of a car that comprises a case main body arranged on the roof of the car to store a folded wheel chair, a rail unit arranged in the case main body and including the first, second and third rails that can be extended and retracted between the roof and the door of the car accessible to the user of the wheel chair. The folded wheel chair is brought into engagement with the third rail that is located lowermost and then stored in the case main body by retracting the first, second and third rails.

However, a wheel chair storage apparatus as disclosed in the above Japanese Utility Model Application Laid-Open No. 3-12598 is accompanied by the following problems.

(1) Since the wheel chair storage apparatus comprises a plurality of rails that have to be extended and retracted when storing the wheel chair, the apparatus has a rather complex configuration to make it liable to become out of order and costly. Additionally, in the case of a one-box type car that stands high, an apparatus of a different version comprising four or more than four rails may have to be installed and therefore the user may be forced to buy a new apparatus when he or she buys a new car. In other words, the applicability of the apparatus is limited.

(2) The operation of folding the wheel chair and bringing it into engagement with the rail unit is an outdoor operation. Therefore, not only the wheel chair but also the owner of the wheel chair itself get wet when it rains. This is by no means desirable to the health of the wheel chair owner. The provision of a water-proof sheet for protecting the wheel chair owner and the wheel chair is, however, not feasible because of the configuration of the apparatus.

(3) Because the wheel chair storage apparatus comprises a rail unit including a plurality of rails that can be extended and retracted, it is rather bulky. In other words, the location at which it can be fitted to the car is limited and may be remote from the door accessible to the user of the wheel chair to provide a great disadvantage for the operation of storing the wheel chair.

BRIEF SUMMARY OF THE INVENTION

In view of the above identified problems and other problems of the prior art, it is therefore the first object of the present invention to provide a wheel chair storage apparatus having a simple configuration that is applicable to various types of cars with different heights without modifying its configuration and can be manufactured at low cost.

The second object of the present invention is to provide a wheel chair storage apparatus that allows a wheel chair to be stored and retrieved with ease and to which a water-proof sheet or cover can be fitted in a simple manner to protect both the wheel chair owner and the wheel chair against rain.

The third object of the invention is to provide a wheel chair storage apparatus adapted to shift the location of the operation of storing the wheel chair depending on the door of the car accessible to the user of the wheel chair (where the user leaves the wheel chair to get into the car and rides onto the wheel chair from the car).

According to the invention, the above first object is achieved by providing a wheel chair storage apparatus adapted to store the wheel chair of a physically handicapped in a folded state in a storage space arranged on the roof of a car, said apparatus comprising a main body including a storage section for storing the folded wheel chair, a fitting means for fitting the main body to the roof of the car, a slider movable back and forth between the main body and a position located above a doorway of the car, a lift means arranged on the lift for lifting the wheel chair from said doorway, a wheel chair folding means interlocked with said lift means for folding the wheel chair being lifted by said lift means, a wheel chair holder for folding said folded wheel chair and an attitude modifying means for modifying the attitude of the wheel chair so as to make it adapted to storage by rotating the wheel chair holder with said wheel chair. Said wheel chair folding means is preferably a belt or a wire having its opposite ends linked to the lateral sides of the wheel chair to be folded together so as to suspend said wheel chair as it is pulled up at the middle thereof.

With the above described arrangement, the slider fitted to the main body is moved horizontally and laterally relative to the car to a position located above a doorway of the car and the belt or the wire of the wheel chair folding means is made to lift the wheel chair vertically. Then, the wheel chair is folded as it is lifted and then rotated with the wheel chair holder until it is stored in the storage section. The wheel chair storage apparatus has a configuration that is simplified more than any comparable conventional apparatus and is practically free from malfunctions. Such a wheel chair storage apparatus can be manufactured at low cost.

The above described first object of the invention can also be achieved by providing a wheel chair storage apparatus adapted to store the wheel chair of a physically handicapped in a folded state in a storage space arranged on the roof of a car, said apparatus comprising a main body including a storage section for storing the folded wheel chair, a fitting means for fitting the main body to the roof of the car, a rotating means for rotating said main body between the position for storing the wheel chair and a position right above a doorway of the car, a lift means arranged on the lift for lifting the wheel chair from said doorway, a wheel chair folding means interlocked with said lift means for folding the wheel chair being lifted by said lift means, a wheel chair holder for folding said folded wheel chair and an attitude modifying means for modifying the attitude of the wheel chair so as to make it adapted to storage by rotating the wheel chair holder with said wheel chair. Said wheel chair folding means is preferably a belt or a wire having its opposite ends linked to the lateral sides of the wheel chair to be folded together so as to suspend said wheel chair as it is pulled up at the middle thereof.

This arrangement of omitting the above described slider can further simplify the configuration of a wheel chair storage apparatus according to the invention.

According to the invention, the above second object is achieved by providing said slider with a water-proof cover. Preferably, said water-proof cover is made of an elastic material.

With this arrangement, as either the slider is adapted to move horizontally between the main body and a position located above a doorway of the car or the main body is adapted to be rotated by a rotating means between the position for storing the wheel chair and a position right above a doorway of the car, the user of the wheel chair can fit the waterproof cover to either the slider or the main body with ease so that not only the user of the wheel chair but also the wheel chair itself is protected against being wetted by rain or snow.

Additionally, when the water-proof sheet is made of an elastic material, it can change its form according to the profile of the wheel chair and the wheel chair holder so that there is no need of providing a space within the slider for preventing the cover and the wheel chair holder and the wheel chair itself from interfering with each other. Then, the height of the wheel chair storage apparatus can be minimized to reduce the overall manufacturing cost.

According to the invention, the above third object is achieved by providing a wheel chair storage apparatus comprising a slider as defined above and additionally a rotating means for rotating said main body relative to said car between the position for storing the wheel chair and a position right above a doorway of the car. Preferably, said rotating means includes a shaft to be used for rotatably fitting said main body to said fitting means, a stopper fitted to said fitting means and arranged eccentrically relative to the axial line of said shaft and an urging means for constantly urging said main body in the direction of returning to the storage space, said slider being provided with an abutment section for abutting said stopper.

With the above arrangement, as the slider is moved away from the main body, its abutment section eventually comes to abut the stopper. Then, as the slider is moved further, both the slider itself and the main body are driven be rotate around the shaft. By selecting appropriate relative positions for the stopper and the shaft, it is possible to place the slider at a position right above the doorway of the car through which the user of the wheel chair moves into the car. The need of arranging a specific drive means for rotating the main body can be eliminated to simplify the configuration of the rotating means and reduce the manufacturing cost by making the rotating means include the above listed components.

Additionally, since the slider can be placed right above the doorway, the effect of preventing both the user of the wheel chair and the wheel chair itself from being wetted by rain or snow can be secured. It will be appreciated that the third object of the invention can be achieved without using a slider.

DETAILED DESCRIPTION OF THE INVENTION

Now, the present invention will be described by referring to the accompanying drawings that illustrate preferred embodiments of the invention.

(Embodiment 1)

Figure 1:
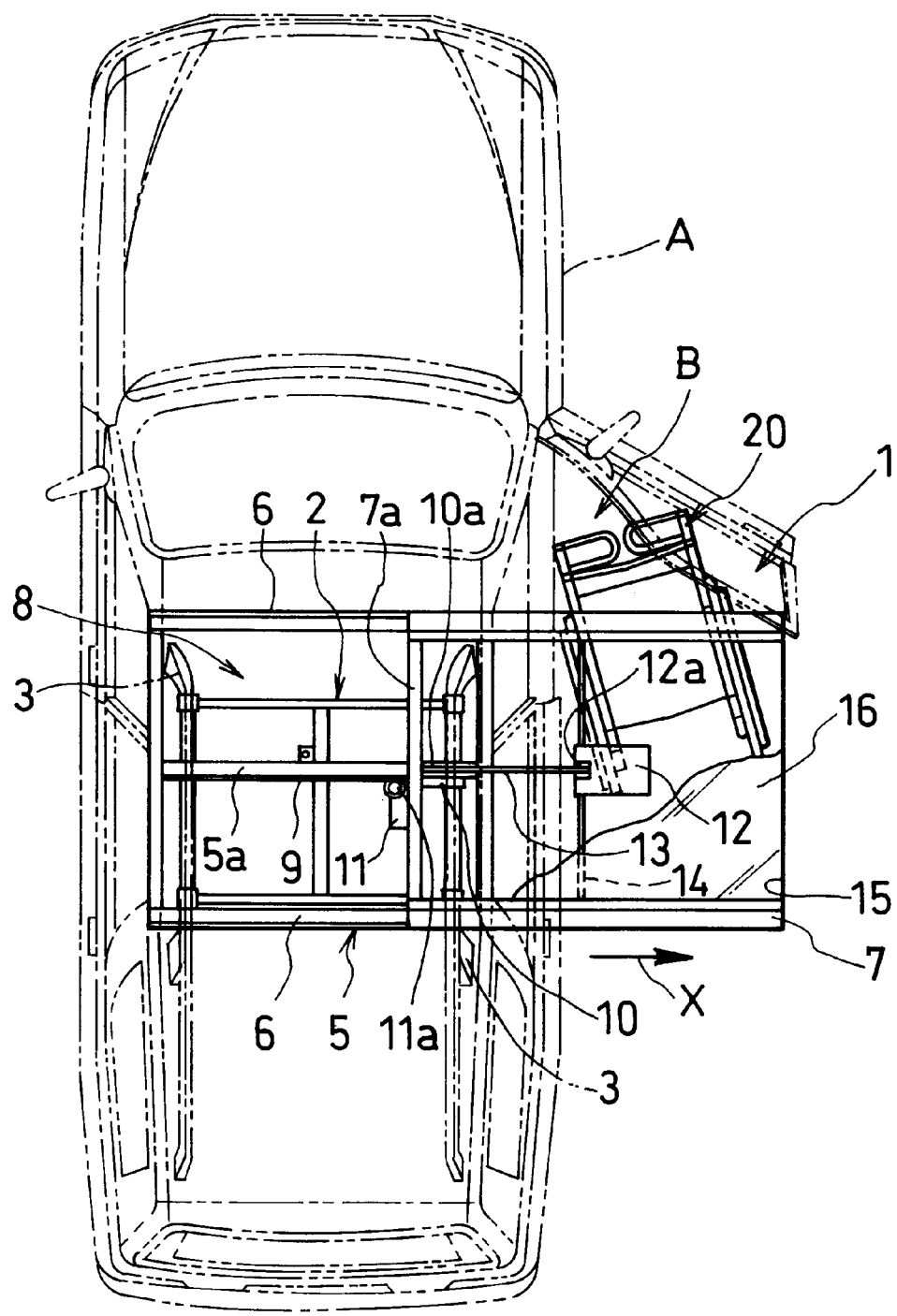
FIG. 1 is a schematic plan view of a first embodiment of wheel chair storage apparatus of a car according to the invention, illustrating its configuration.
Figure 2:
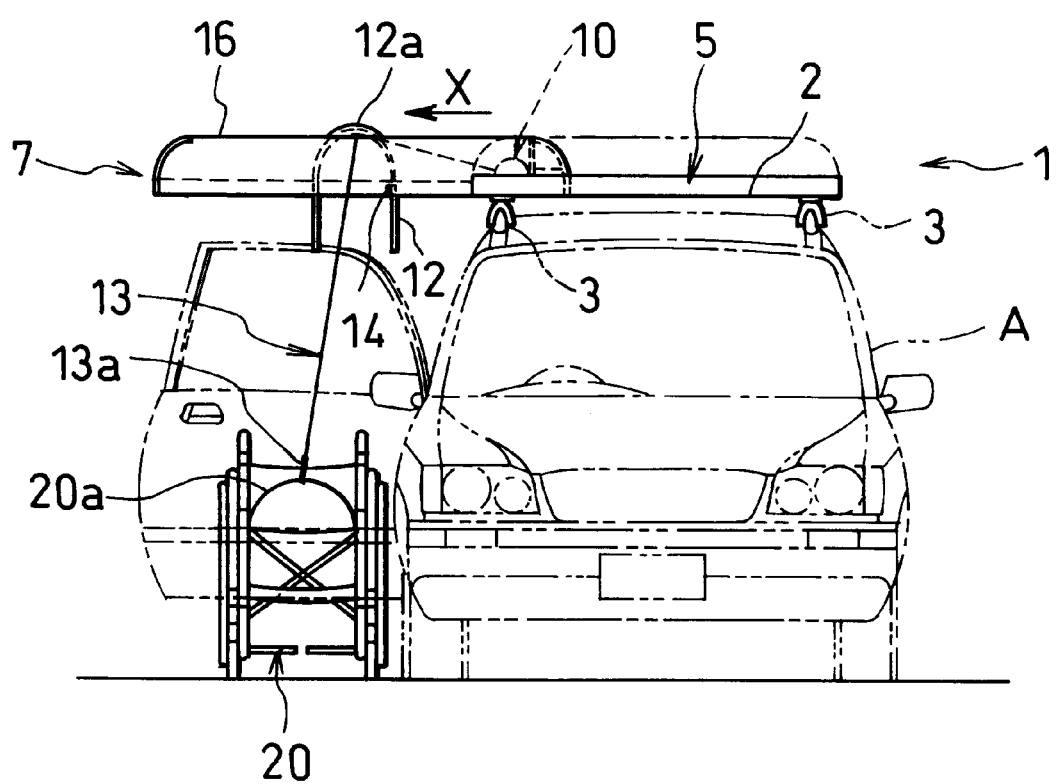
FIG. 2 is a schematic front view of the embodiment of wheel chair storage apparatus of a car shown in FIG. 1.

FIGS. 1 and 2 schematically illustrate a first embodiment of wheel chair storage apparatus of a car according to the invention. FIG. 1 is schematic a plan view and FIG. 2 is a schematic front view of the embodiment. In the following description, the expression "forward and rearward" or "longitudinally" is used relative to the car (e.g., upward and downward in FIG. 1), while the expression "leftward and rightward" or "laterally" is also used relative to the car (e.g., leftward and rightward in FIG. 1).

Support members 3, 3 are fitted to car A along lateral side rails of the car A and hence they are extending longitudinally. While the support members 3, 3 may be specifically designed for a wheel chair storage apparatus according to the invention, those of a commercially available ski carrier or a commercially available baggage carrier can be used without any problem for the purpose of the invention. A lattice-like fitting member 2 extending laterally on the roof of the car A is fitted to the support members 3, 3. Then, the apparatus main body 5 having a storage space 8 for storing a folded wheel chair 20 is fitted to the fitting member 2. Thus, with this embodiment, the fitting means for fitting a wheel chair 5 onto the roof of the car A includes the fitting member 2 and the support members 3, 3.

The main body 5 also has a lattice-like configuration and includes a laterally extending central transversal beam 5a. A rack 9 is fitted to the central transversal beam 5a along its length. The main body 5 additionally includes front and rear transversal beams 6, 6, which are guide rails 6, 6 running in parallel with the rack 9. Then, a slider 7 also having a lattice-like configuration is arranged along the guide rails 6, 6 in such a way that it may be laterally movable (along the direction indicated by arrow X in FIG. A). The guide rails 6, 6 are preferably provided with rollers or bearings so that the slider 7 may move back and forth smoothly.

The slider 7 has a left longitudinal beam 7a running longitudinally along the left end of the slider 7 and a slider drive motor 11 is secured to the left longitudinal beam 7a. A pinion 11A is fitted to the rotary shaft of the slider drive motor 11 and held in engagement with the rack 9. Thus, as the slider drive motor 11 is operated, the pinion 11a is driven to move along the rack 9 to move the slider 7 as it is held in engagement with the rack 9. It will be appreciated that the rack and pinion assembly may be replaced by a linear motor or some other known linear drive mechanism if it can drive the slider laterally back and forth.

The slider drive mechanism including the slider drive motor 11 is preferably provided with a brake mechanism so that the slider 7 may not inadvertently move when the wheel chair 20 is stored in position or when the car A is running or stopped. The drive operation of the slider drive motor 11 is preferably controlled by means of a hand switch located near the driver seat so that the user of the wheel chair may easily operate it when storing the wheel chair. It may be so arranged that the hand switch is operated by means of a remote control unit. It is still preferable that the hand switch is turned off when the engine of the car A is energized or the key switch of the car A is turned on and while the car is in operation.

While not shown, the rack is preferably provided near the opposite ends thereof with detection means such as limit switches or proximity switches so that the slider 7 getting to the left or right end of the guide rails 6, 6 may be detected and the operation of the slider drive motor 11 may be automatically stopped when the slider 7 gets to that end.

A lift motor 10 for lifting the wheel chair 20 is fitted to the left longitudinal beam 7a and a belt 13 is wound around a winding drum 10a fitted to the rotary shaft of the lift motor 10. The belt 13 is provided with a hook 13a at the front end thereof. It is also preferable that the lift motor 10 is operated by means of a hand switch.

In this embodiment, the wheel chair 20 is folded laterally at the center of its seat. The wheel chair 20 is provided with a lifting belt 20a extending transversally across the seat. The hook 13a is made to hold the lifting belt 20a at the middle thereof. As the hook 13a is pulled up to take up the lifting belt 20a and hence the wheel chair 20, the wheel chair 20 is folded laterally by its own weight. Thus, the wheel chair folding mechanism of the embodiment is constituted by the hook 13a and the lifting belt 20a.

The slider 7 is provided with an open area 15 for receiving the folded wheel chair 20 as the latter is facing lateral sides of the car. A shaft 14 is running longitudinally along the left edge of the open area 15 and a wheel chair holder 12 is supported by the shaft 14 at a lateral side thereof. As seen from FIG. 2, the wheel chair holder 12 is made to show an inversely U-shaped cross section as viewed from the front of the car when the wheel chair 20 is lifted by the belt 13. The wheel chair holder 12 receives the folded wheel chair 20 and then holds the wheel chair 20 at the lateral sides thereof without any further movement.

The inversely U-shaped wheel chair holder 12 is provided at the top thereof with a hole 12a for allowing the belt 13 to pass therethrough. Since the wheel chair holder 12 is supported by the shaft 14 at a position eccentric relative to the top thereof, the wheel chair holder 12 is turned clockwise around the shaft 14 as the belt 13 is wound on after the wheel chair 20 is received by the wheel chair holder 12 in FIG. 2. As a result, the wheel chair 20 is made to take a substantially lying flat attitude and become ready for being stored. In other words, the belt 13, the shaft 14 and the lift motor 10 constitute an attitude modifying mechanism for modifying the attitude of the wheel chair 20.

An elastic water-proof cover 16 is made to cover the entire upper surface of the slider 7. Alternatively, the water-proof cover 16 may be made to cover only part of the slider 7 if the wheel chair 20 and the user of the wheel chair 20 located at the doorway are protected against rain in wet weather. While the cover 16 may be made of a hard material such as hard plastic or metal, it is preferably made of a flexible material such as rubber, vinyl or polyethylene because a sheet of such a material can take any shape that conforms to the profile of the wheel chair holder 12 and that of the wheel chair 20 so that it is not necessary to provide any extra space or escape area for avoiding interference with the wheel chair holder 12 and/or the wheel chair 20, while the use of a metal or hard plastic cover may require such a provision. Thus, the wheel chair storage apparatus 1 can be made compact and the manufacturing cost of the apparatus can be reduced.

In this embodiment, a rotating means is provided for rotating the main body 5 and the slider 7 relative to the car A in order to eliminate the horizontal gap that can otherwise arise between the location of the wheel chair storage apparatus 1 on the car A and that of the doorway B of the car A to be used when the user of the wheel chair 20 moves into the car A.

Figure 3:
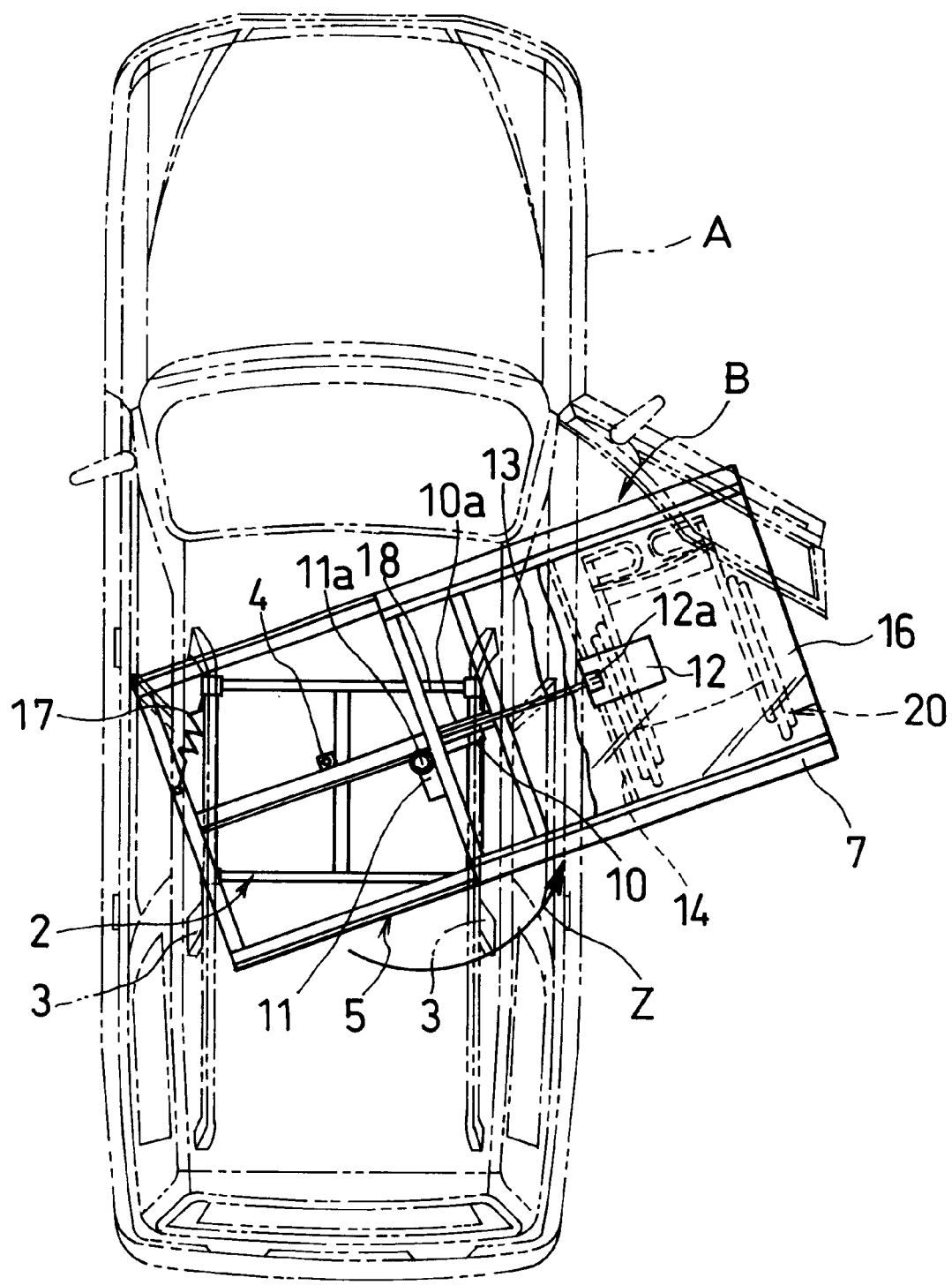
FIG. 3 is a schematic plan view of an wheel chair storage apparatus of a car according to the invention and comprising a rotating means.
Figure 4:
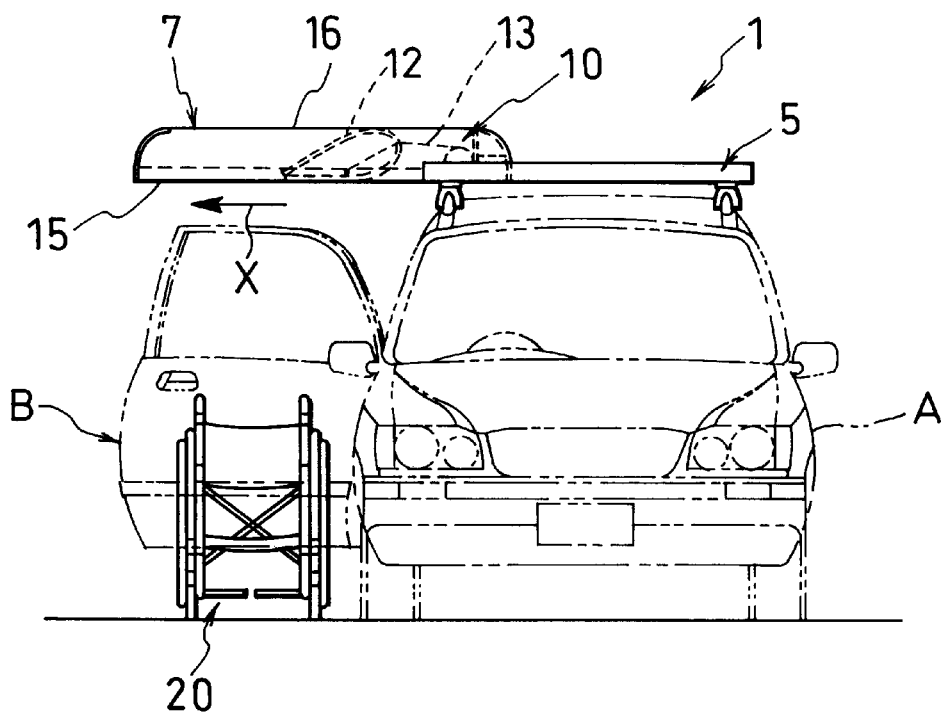
FIG. 4 is schematic front view of the first embodiment of wheel chair storage apparatus according to the invention, illustrating the slider moved away from the roof of the car.

FIG. 3 is a schematic plan view of the main body 5 comprising such a rotating means. In FIG. 3, the components same as those of FIG. 1 are denoted respectively by the same reference symbols and would not be described any further.

The main body 5 is fitted to the fitting member 2 by means of a shaft 4 and rotatable on a plane parallel to the roof of the car A (the sense of rotation being indicated by arrow Z in FIG. 3). A stopper 18 is arranged at a position eccentrically displaced from the axial line of the main body 5 passing through the transversal beam 5a and made to abut the inner lateral side of the longitudinal beam 7a of the slider 7. It is preferable that the position at which the stopper 18 is fitted is laterally adjustable along the fitting member 2 so that the angle or rotation of the main body 5 may be modifiable. A tensile coil spring 17 is arranged between the main body 5 and the fitting member 2 to urge the main body 5 toward the position at which the wheel chair is stored (storage position) on the car A. Although not shown, the fitting member 2 is provided with a stopper that abuts the main body 5 to hold the main body 5 to said storage position against the resilient force of the tensile coil spring 17.

With the above described arrangement, as the slider 7 is moved along the guide rails 6, 6 from the retracted state by operating the slider drive motor 11, the longitudinal beam 7 of the slider 7 abuts the stopper 18 in the way of the slider's movement. Since the slider is forced to move further along the guide rails 6, 6 by the slider drive motor 11, the main body 5 and the slider 7 are rotated counterclockwise around the shaft 4 in FIG. 3. The angle of rotation can be modified by adjusting the position at which the stopper 18 is fitted.

Now, how the wheel chair 20 is stored in the wheel chair storage apparatus 1 having the above described configuration will be described by referring to FIGS. 2 and 4 through 7.

Figure 7:
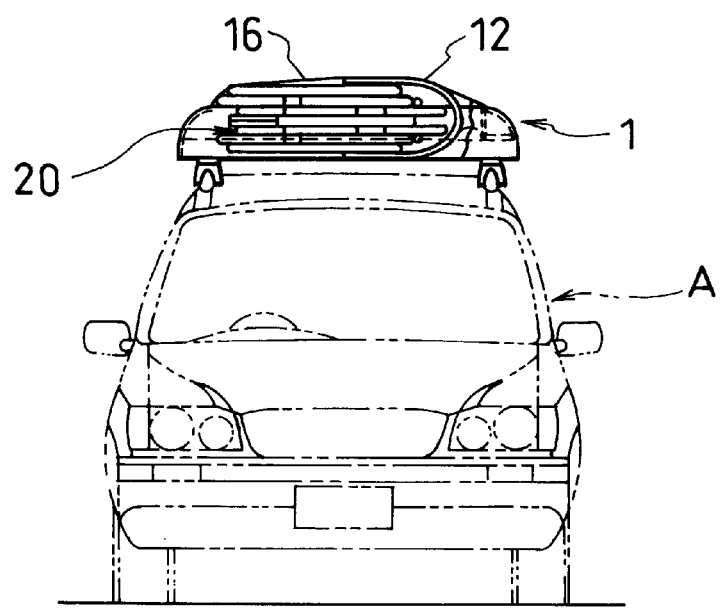
FIG. 7 is a schematic front view of the first embodiment of wheel chair storage apparatus according to the invention, illustrating the wheel chair completely stored in the wheel chair storage apparatus.

Referring to FIG. 7, for storing the wheel chair 20 in the apparatus, the wheel chair 20 is placed near the doorway B and the slider drive motor 11 is operated by means of the hand switch (not shown) to drive the slider 7 toward the right side of the car A along the guide rails 6, 6. The lift motor 10 is stopped when the slider 7 is driven to its extreme position where it projects from the roof of the car A and abuts the limit switch (not shown).

If the apparatus is provided with a rotating means as shown in FIG. 3, the slider can be driven to rotate with the main body 5 by a desired angle so that the open area 15 of the slider 7 may be located right above the wheel chair 20 even if there is a gap between the doorway B (where the wheel chair 20 is located) and the wheel chair 20 storage position of the car A.

Then, referring to FIG. 2, the lift motor 10 is operated by means of the hand switch to unwound the belt 13 from the winding drum 10a. As a result, the hook 13a at the front end of the belt 13 is lowered. Then, as the belt 13 is wound up, the wheel chair holder 12 housed in the slider 7 is rotated around the shaft 14 by its own weight and turns its inversely U-shaped contour toward the wheel chair 20. Then, the user of the wheel chair takes the lowered hook 13a and make it hold the middle point of the lifting belt 20a arranged on the seat of the wheel chair 20.

Figure 5:
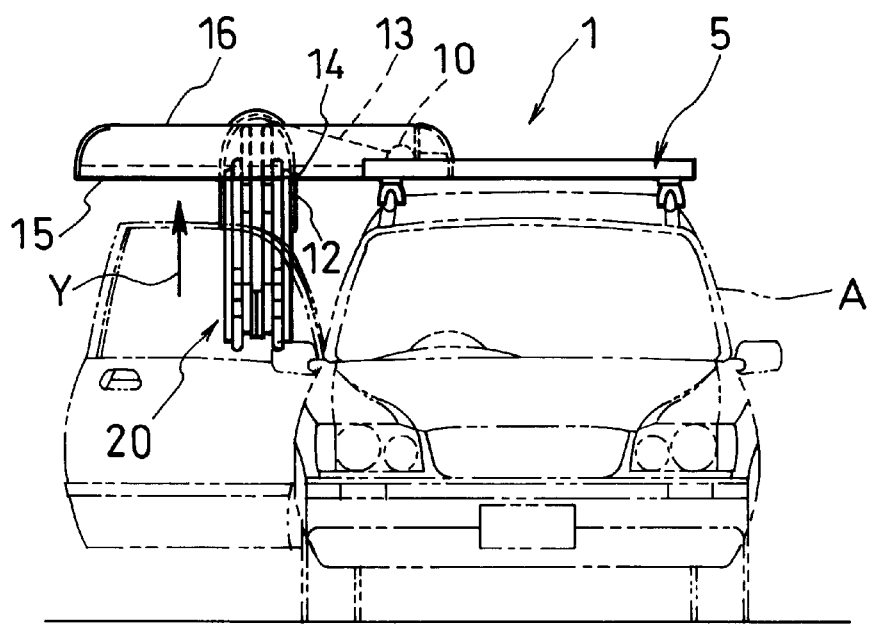
FIG. 5 is a schematic front view of the first embodiment of wheel chair storage apparatus according to the invention, illustrating the wheel chair suspended and inserted into the wheel chair holder.

Then, the lift motor 10 is driven reversely by operating the hand switch (not shown) under this condition. As a result, the wheel chair 20 is lifted as the belt 13 is wound up by the winding drum 10a. Then, as shown in FIG. 5, the wheel chair 20 is automatically folded from the lateral sides thereof by its own weight as it is lifted (in the direction indicated by arrow Y in FIG. 5) and inserted into the wheel chair holder 12 in a completely folded state.

Figure 6:
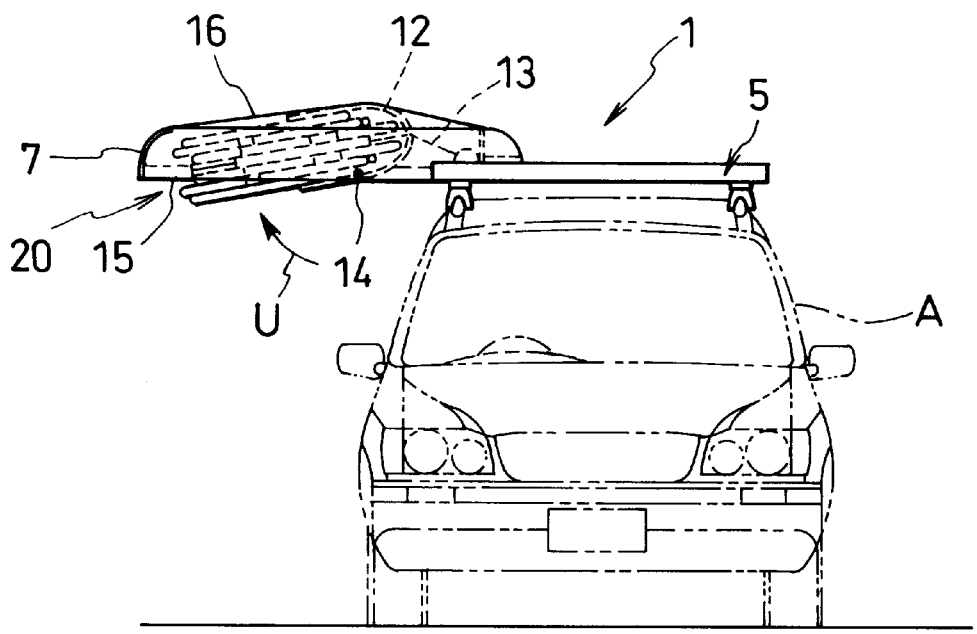
FIG. 6 is a schematic front view of the first embodiment of wheel chair storage apparatus according to the invention, illustrating the wheel chair holder holding the wheel chair being stored in the slider by winding up the belt.

After the wheel chair 20 is inserted into the wheel chair holder 12, the lift motor 10 continues its operation so that the belt 13 pulls the top of the wheel chair holder 12 toward the winding drum 10a and rotates the wheel chair holder 12 around the shaft 14 in the sense as indicated by arrow U in FIG. 6. As a result, the wheel chair 20 is made to lie flat and put into the slider 7 through the open area 15. As the wheel chair 20 is completely put into the slider 7, the operation of the lift motor 10 is automatically stopped by means of a limit switch or a load switch of the lift motor (not shown).

As the slider drive motor 11 is driven reversely by operating the hand switch (not shown), the slider 7 is moved to the roof of the car A to place the wheel chair in the stored state as shown in FIG. 7.

The above procedure should be reversed to take out the wheel chair 20 from the wheel chair storage apparatus 1.

(Embodiment 2)

Now, a second embodiment of the invention will be described by referring to FIGS. 8 and 9.

Figure 8:
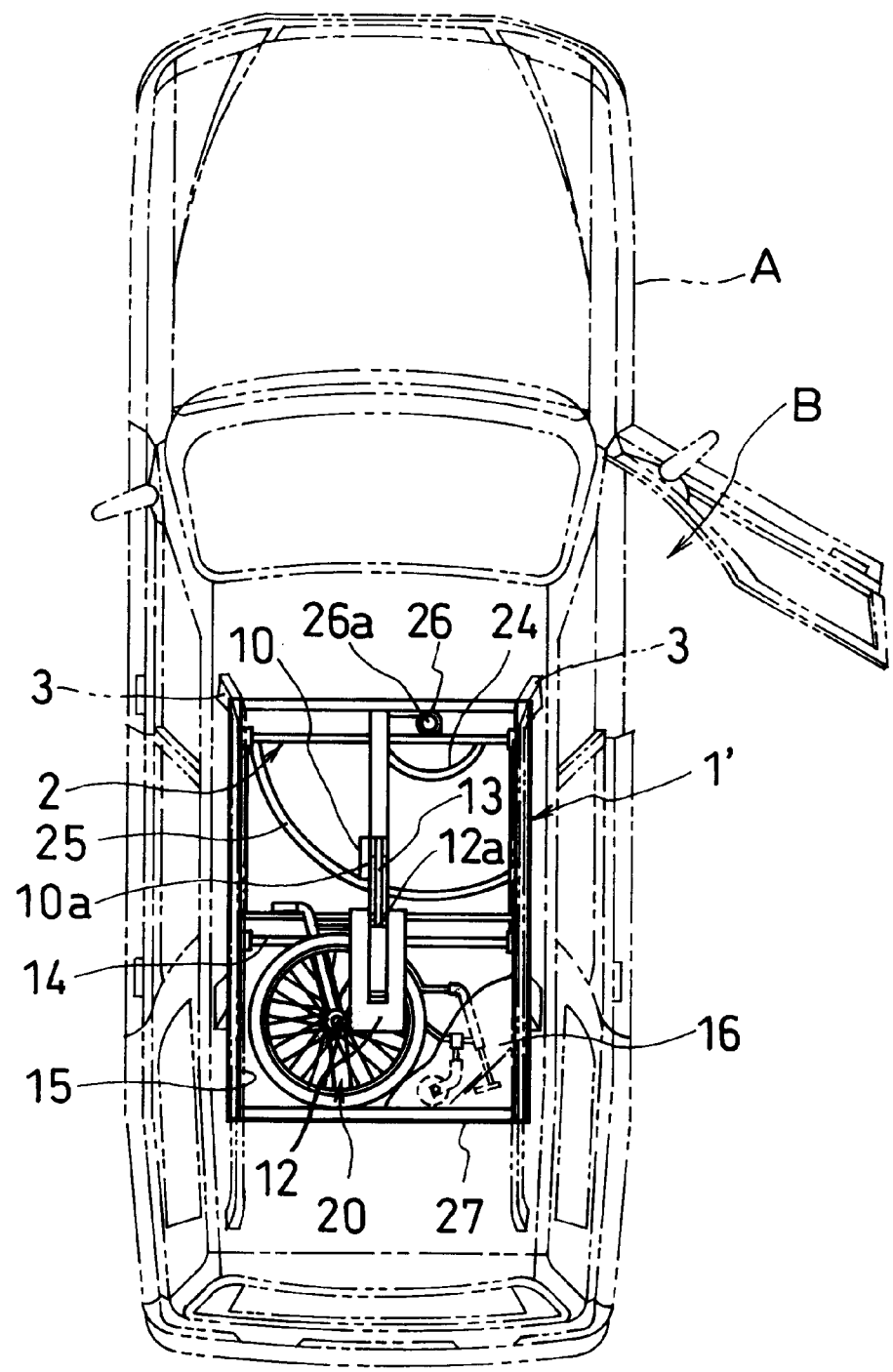
FIG. 8 is a schematic plan view of a second embodiment of wheel chair storage apparatus of a car according to the invention, illustrating its configuration.
Figure 9:
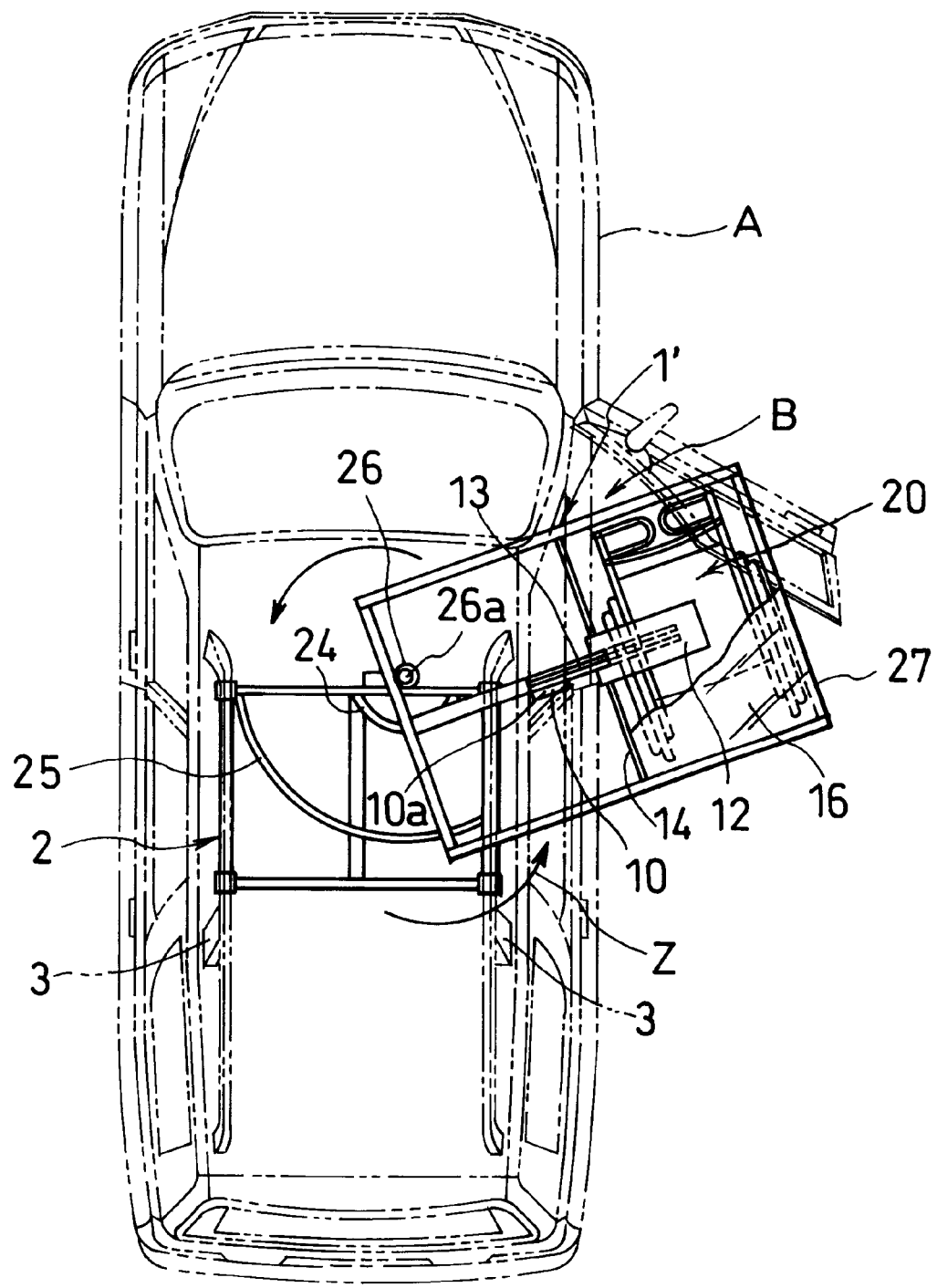
FIG. 9 is a schematic plan view of the embodiment of FIG. 8, illustrating how it is operated.

Referring to FIG. 8, with this embodiment, a wheel chair 20 is stored in a position displaced backwardly from the doorway B of the car A. The fitting member 2 is provided with a pair of arc-shaped guide rails 24, 25 arranged concentrically with different radii of curvature so that the main body 27 may reciprocally rotate between the storage position as shown in FIG. 8 and the wheel chair lifting position (doorway B) as shown in FIG. 9 (in the sense of rotation as indicated by arrow Z in FIG. 9) while it is supported by the guide rails 24, 25.

The main body 27 of the wheel chair storage apparatus 1' of this embodiment may also be provided with a slider that can reciprocate as in the above described first embodiment. However, in this embodiment, the slider 7 of the main body of the first embodiment is replaced by an arrangement similar to the slider 7 of the first embodiment except that it is devoid of the slider drive motor 11 (see FIG. 1). Thus, the components of the arrangement of this embodiment that is similar to the slider 7 of the first embodiment are denoted in FIGS. 8 and 9 respectively by the same reference symbols as the first embodiment and would not be described any further.

The main body 27 of this embodiment is rather wide on the car A and made to partly project rightward from the car A simply by rotating to a position above the doorway B so that the open area 15 comes to be located right above the doorway B.

The main body 27 having the above configuration is then linked to a rotary shaft 26a of a motor 26 fitted to a front portion of the fitting member. The rotary shaft 26a is located at the center of arc-shaped guide rails 24, 25 and linked to the main body 27 typically by means of a key so that the rotary shaft 26a and the main body 27 may be rotated integrally. It may be so arranged that the operation of the motor 26 is controlled by means of a hand switch as in the case of the first embodiment and made to automatically stop by a detection means such as limit switch. Additionally, it may also be so arranged that the main body 27 is prevented from rotating excessively by means of a stopper.

With the arrangement of the wheel chair storage apparatus 1 of this embodiment, the use of the slider 7 of the first embodiment can be eliminated to simplify the configuration of the wheel chair storage apparatus 1. Additionally, as in the case of the first embodiment, the open area 15 of the main body 27 can be positionally adjusted and placed right above the doorway B by appropriately shifting the position of the limit switch or the stopper or by appropriately operating the motor 26 by means of the hand switch.

For storing the wheel chair 20 in the wheel chair storage apparatus 1, firstly, the open area 15 of the main body 27 is moved right above the doorway B by operating the motor 26. Then, as in the case of the first embodiment, the wheel chair 20 is lifted and put into the open area 15 by modifying its attitude. Thereafter, the motor 26 is driven reversely to rotate the main body 27 in order to move it to the storage position as shown in FIG. 8.

With this embodiment, the rotary shaft 26a of the motor 26 is positioned on the longitudinal axis running through the center of the car and guide rails 24, 25 are arranged appropriately so that the main body 27 can be rotated appropriately toward either the left side or the right side of the car A.

(Other Embodiments)

While the present invention is described above by way of preferred embodiments of the invention, the present invention is by no means limited thereto.

For instance, the means for folding the wheel chair is constituted by the hook 13a and the lifting belt 20a in the above description, the hook 13a may be replaced by a bifurcated hook fitted to the front end of the belt 13 so that the wheel chair 20 may be seized by the hook at the opposite lateral sides thereof. With this arrangement, the wheel chair 20 will also be folded from the lateral sides as it is lifted.

The configuration of the rotating means for rotating the main body 5 by a desired angle of rotation relative to the car A is not limited to the above description. Alternatively, the rotating means may comprise a motor and a rack and pinion mechanism or a cylinder. Similarly, the means for reciprocating the slider 7 may alternatively be made to comprise a cylinder or a linear motor.

While the attitude modifying means of either of the above embodiments comprises a belt 13, a shaft 14 and a lift motor 10 in the above description, it may have any desired configuration so long as it can drive both the wheel chair 20 and the wheel chair holder 12 to rotate. For example, it may be so arranged that the wheel chair holder 12 is drawn into the inside of the slider 7 to modify its attitude as the belt is taken up.

Additionally, while the wheel chair holder 12 is turned around the shaft 14 to modify its attitude and face sideways for storage in either of the above embodiments, it is also possible to provide an arrangement for holding the shaft by means of a link mechanism in order to make it easy to shift the shaft and modify the attitude of the wheel chair holder 12 as the latter is lifted. Still additionally, it is also possible to provide an arrangement of lifting the water-proof cover so that the motion of the wheel chair holder 12 may not be hindered by the cover.

It will be appreciated that the wheel chair storage apparatus 1 can be turned reversely by arranging the fitting member 2 rotatable relative to the support members 3, 3 so that the user of the wheel chair may ride into the car from the doorway located at the driver seat and leave the car from the door way located at the passenger seat. Then, a same wheel chair storage apparatus can be used for both a car having the driver seat at the right side and a car having the driver seat at the left side to broaden the scope of applicability of the apparatus.

As described above in detail, a wheel chair storage apparatus according to the invention has a simple configuration and hence can be manufactured at low cost. Additionally, it is free from malfunctions and operates reliably. Still additionally, since the wheel chair is lifted up and down by means of a belt or a wire, the apparatus can be applied to any car regardless of the height thereof.

A wheel chair storage apparatus according to the invention can prevent both the user of the wheel chair and the wheel chair from being wetted by rain by simply arranging a cover on the slider that reciprocates above the doorway and/or the main body that is lifted to a position right above the door way. Obviously, such an anti-rain measure can be provided with little cost.

Finally, when the main body is made to rotate, the open area of the apparatus for receiving the wheel chair can be placed right above the doorway even if the position for storing the wheel chair on the car is not vertically aligned with the doorway.

What is claimed is:

1. A wheel chair storage apparatus adapted to store the wheel chair of a physically handicapped person in a folded state in a storage space arranged on the roof of a car, said apparatus comprising:
   a main body including a storage section for storing the folded wheel chair;
   a fitting means for fitting the main body to the roof of the car;
   a slider movable back and forth on the main body between a position over the main body and a position located above a doorway of the car;
   a lift means arranged on the slider for lifting the wheel chair from said doorway;
   a wheel chair folding means interlocked with said lift means for folding the wheel chair being lifted by said lift means;
   a wheel chair holder for holding said folded wheel chair; and
   an attitude modifying means for modifying the attitude of the wheel chair so as to make it adapted to storage by rotating the wheel chair holder with said wheel chair.

2. A wheel chair storage apparatus according to claim 1, further comprising a water-proof cover for covering said slider.

3. A wheel chair storage apparatus according to claim 1, wherein said wheel chair folding means is a belt or a wire having its opposite ends linked to the lateral sides of the wheel chair to be folded together so as to suspend said wheel chair as it is pulled up at the middle thereof by said lift means.

4. A wheel chair storage apparatus according to claim 1, further comprising a rotating means for rotating said main body relative to the car between a position for storing the wheel chair and a position right above a doorway of the car.

5. A wheel chair storage apparatus according to claim 4, further comprising a shaft for rotatably fitting said main body to said fitting means, a stopper fitted to said fitting means and arranged eccentrically relative to the axis of said shaft and an urging means for constantly urging said main body in the direction of returning to the storage position, said slider being provided with an abutment section for abutting said stopper.

6. A wheel chair storage apparatus adapted to store the wheel chair of a physically handicapped person in a folded state in a storage space arranged on the roof of a car, said apparatus comprising:
   a main body including a storage section for storing the folded wheel chair;
   a fitting means for fitting the main body to the roof of the car;
   a rotating means for rotating said main body between a position for storing the wheel chair and a position right above a doorway of the car;
   a lift means arranged on the main body for lifting the wheel chair from said doorway;
   a wheel chair folding means interlocked with said lift means for folding the wheel chair being lifted by said lift means;
   a wheel chair holder for holding said folded wheel chair; and
   an attitude modifying means for modifying the attitude of the wheel chair so as to make it adapted to storage by rotating the wheel chair holder with said wheel chair.

7. A wheel chair storage apparatus according to claim 6, further comprising a water-proof cover for covering said main body.

8. A wheel chair storage apparatus according to claim 6, wherein said water-proof cover is made of an elastic material.

* * * * *